Aug. 9, 1960     C. J. BARRETT     2,948,359
VEHICLE BRAKE APPARATUS
Filed Dec. 31, 1957     2 Sheets-Sheet 1
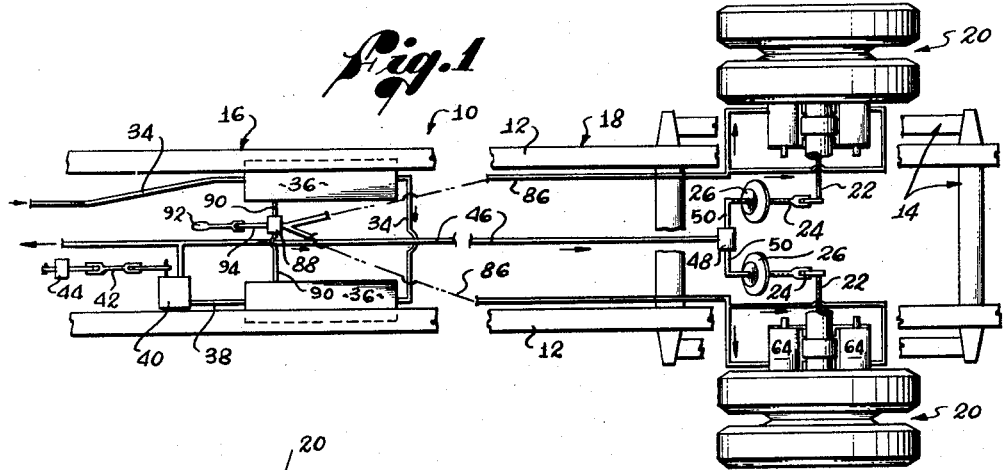
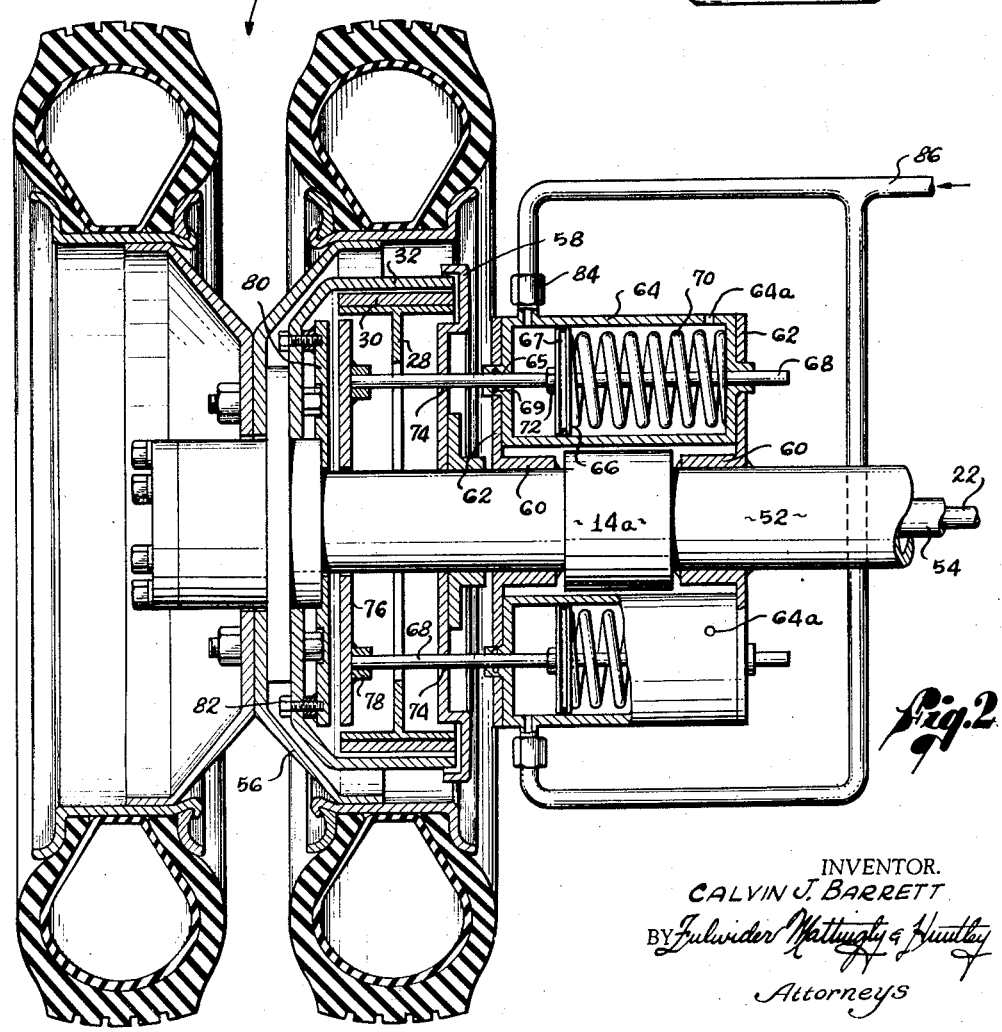
INVENTOR.
CALVIN J. BARRETT
BY *Fulwider Mattingly & Huntley*
Attorneys Aug. 9, 1960   C. J. BARRETT   2,948,359
VEHICLE BRAKE APPARATUS
Filed Dec. 31, 1957   2 Sheets-Sheet 2

INVENTOR
CALVIN J. BARRETT
BY Fulwider, Mattingly & Huntley
ATTORNEY

United States Patent Office 2,948,359
Patented Aug. 9, 1960

2,948,359

VEHICLE BRAKE APPARATUS

Calvin J. Barrett, Long Beach, Calif., assignor of forty-nine percent to Albert F. Cruse, Long Beach, Calif.

Filed Dec. 31, 1957, Ser. No. 706,329

9 Claims. (Cl. 188—106)

The present invention relates generally to motor vehicle brakes and particularly to brakes for heavy freight or passenger vehicles arranged to serve as an automatically actuated emergency brake, a parking brake or concurrently with the conventional brake system of the vehicle as an auxiliary brake.

Compressed air provides sufficient braking force to control even the heaviest vehicles. Accordingly, its use is preferred in buses, full-trailers, semi-trailers, heavy trucks and tractors. Conventional air brakes are usually adequate; however, heavy vehicles are frequently involved in spectacular accidents due to a brake failure of one type or another. One common type of failure is a malfunction of a part of the apparatus which provides the braking force to the brake, such as a rupture of an air line, or a leak in a booster or power chamber, or failure of the air compressor. Another type of failure is due to the phenomenon known as "brake fade." This phenomenon results in heavy traffic or on long down hill grades when due to the heat generated by frequent application of the brakes, the brake drums expand. As a result, even though air pressure is present the brakes do not function because the throw of the brake actuating linkage is insufficient to hold the brake shoe and lining in braking engagement with the brake drum.

An object of my invention is to provide a spring-loaded disc-type of auxiliary braking system which is usable with a conventional air brake system to automatically stop a vehicle upon failure of the power source of the conventional brake system.

Another object of the invention is to provide an auxiliary brake of this type which can be used concurrently with the conventional brake, or alone, to bring the vehicle to a halt during the phenomenon known as brake fade.

Yet another object of my invention is to provide apparatus of this type which is also usable as a parking brake which can be selectively or automatically applied.

A further object of the present invention is to provide a disc-type auxiliary brake that can be incorporated into new or old vehicles without interfering with the efficiency or structure of the conventional air brake and which involves no radical modification of motor vehicles on which the invention is used.

In carrying out my invention I have provided a brake disc axially movably mounted on the axle housing for cooperation with a cooperating portion of, or a disc member affixed to, a wheel of the vehicle. The brake disc is drivingly engaged by a plurality of spring means supported on the axle housing which at all times tend to thrust the disc into engagement with the cooperating portion of the wheel to apply a braking force thereto. The spring means are mounted within cylinders and act against a piston element in the cylinders. The sides of the pistons opposite to the spring means are exposed to the normal operating perssure of the conventional brake means of the vehicle, this operating pressure acting to compress the spring means to hold the brake disc out of engagement with the wheel. Upon failure of the operating pressure, or upon selective reduction of this pressure, the brake disc is thrust by the spring means against the cooperating surface of the wheel to act as a brake.

In the drawings:

Figure 1 is a schematic plan view of a motor vehicle incorporating apparatus embodying the present invention;

Figure 2 is a sectional view taken along the axis of an axle mounting the brake means embodying the present invention.

Figure 3:
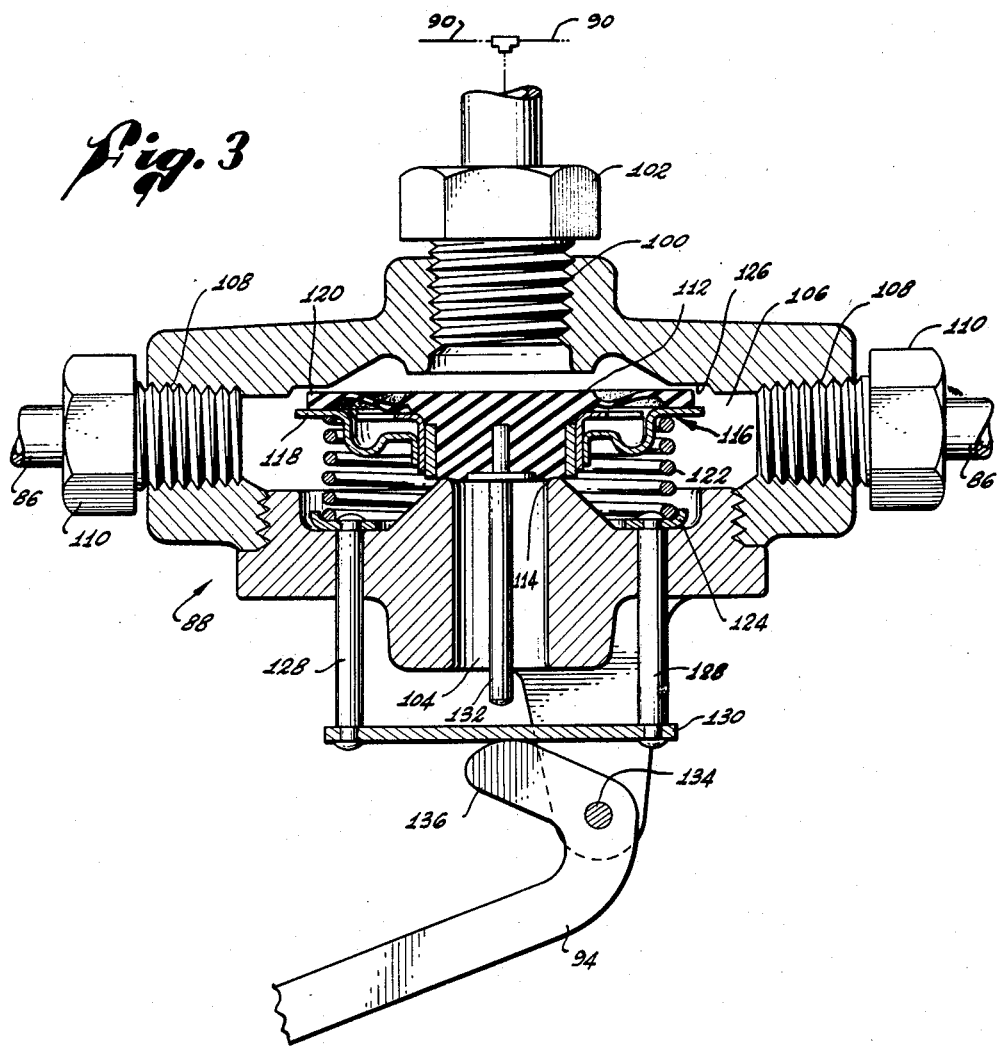
Figure 3 is an axial sectional view of one form of valve control that may be utilized, if desired.

Referring to the drawings and particularly to Figure 1, a motor vehicle designated generally by the numeral 10 has conventional frame elements 12 supported by wheel suspension means 14. The vehicle 10 can be a motor truck or tractor, or a tractor and trailer. For purposes of illustration the left hand or forward portion of the vehicle designated by the numeral 16 is a tractor portion of a vehicle while the right hand or rearmost portion 18 of vehicle 10 is a trailer or semi-trailer provided with a dual wheel assembly 20 on opposite sides thereof, which may be of any conventional construction.

Vehicle 10 is provided with a conventional air brake system which includes a cam shaft 22 for each of the dual wheel assemblies 20 drivingly connected through suitable linkage 24 to a booster or power unit 26. The boosters 26 are actuated by air pressure in order to effect a braking action on each of the dual wheel assemblies 20. Referring now to Figure 2, conventional brake shoes 28 are operatively associated with the cam shaft 22 to thrust frictional lining element 30 attached thereto into braking engagement with a brake drum 32 carried by the innermost of the duel wheels of the assembly 20.

In the tractor 16 an air pump or compressor (not shown) driven by the vehicle engine is used to compress air and force it through conduits 34 into reservoirs 36 where it is stored under pressure and made available for operating the brakes. By means of conduit 38 the series connected reservoirs 36 communicate with a brake valve 40 operable through suitable linkage 42 by a brake pedal 44 to release fluid pressure to a brake line 46 thorugh a quick-release valve 48, one of such quick-release valves 48 being disposed adjacent each pair of oppositely disposed wheel assemblies 20. Upon actuation of the brake pedal 44 compressed air is released through this system and conduits 50 connecting the quick-release valve to boosters 26 to force a diaphragm (not shown) in boosters 26 to move a plate thereon which drivingly engages the linkage 24 to operate brake shoes 28 through cam shafts 22.

The brake system heretofore described is entirely conventional and so will not be described in detail. It will be apparent that upon any rupture of any portion of the fluid pressure system that the brake shoes 28 and the brake element 30 fastened thereto cannot be forced into engagement with brake drums 32. Also if excessive heat is generated in dual wheel assemblies 20, the brake drums 32 will expand to such an extent that the stroke of the linkage throwing brake shoes 30 outwardly towards brake drum 32 will not be sufficient to hold the frictional braking elements 30 in forceful braking engagement with the drums 32. The present invention operates automatically in the event of such failures, or can be controlled by the operator of vehicle 10 in order to bring the vericle to a halt.

Referring now to Figure 2, it will be seen that wheel assembly 20 is supported on an axle housing 52 containing an axle 54 drivingly engaged with the dual assembly 20. As is conventional, the brake drum 32 is rigidly secured to the inner wheel 56 of the wheel assembly 20 and rotates therewith. A brake shield 58 is rigidly secured to the axle housing 52 at a point spaced inwardly from the inner wheel 56 and serves to prevent the entry of dust and other contaminating material into the conventional brake apparatus contained between the shield 52 and the drum 32. In the interest of clarity in the drawing, the means for actuating the brake shoes 28 such as an anchor pin for the brake shoes and a cam roller for spreading the brake shoes apart have not been shown. However, as will be readily apparent to those skilled in the art, the operation or disposition of these parts is in no way effected by the presence of the auxiliary brake system of my invention.

In order to support an auxiliary brake adjacent to each wheel assembly 20 a pair of annular plates 62 are securely affixed, as by welding, to axle housing 52 on opposite sides of the suspension spring seat 14a, each plate 62 having a hub portion 60 adapted to receive housing 52 therein. Rigidly mounted between the plates 62 are a plurality of power cylinders 64 which are preferably equally circularly spaced around the axis of axle housing 52 and disposed in longitudinal alignment therewith. Axially slidably mounted in each power cylinder 64 is a piston 66 carrying a piston rod 68 which protrudes outwardly of power cylinder 64 towards the wheel assembly 20. A heavy coil spring 70 is compressed in each power cylinder 64 between the inward side of piston 66 and the inner end wall of the power cylinder 64 and at all times biases the piston 66 and the rod 68 carried thereby outwardly of the power cylinder 64. An adjustment nut 72 threadedly engages piston rod 68 adjacent the outer face of piston 66 whereby the compressive force of springs 70 can be adjusted. Engagement of adjustment nut 72 with the outer end wall of power cylinder 64 limits the outward travel of the piston rods 68.

Piston rods 68 extend slidably outwardly through suitable bores 74 formed in brake shield 58 and at their outermost ends rigidly support a brake disc 76 by threadedly engaging nut member 78 or the like preferably welded to the inner face of the disc 76. As can be seen in Figure 2, the disc 76 is of lesser outer diameter than the inner diameter defined by the brake shoes 28 and is freely axially movable inside of the brake drum 32. The disc 76 is preferably made of pressed steel and confronts a wheel disc 80 of substantially the same size rigidly secured as by stud bolts 82 to the inner face of inner wheel 56 of the wheel assembly 20. Wheel disc 80 is preferably made of cast iron or cast steel to provide an efficient braking surface in conjunction with the cooperating brake disc 80.

In order to normally hold the brake disc 76 out of engagement with the wheel disc 80 each of the power cylinders 64 at the outermost ends thereof is provided with a suitable fitting 84 by means of which the interior of power cylinder 64 on the outermost side of piston 66 is communicated through suitable conduits 86 with the fluid pressure contained in reservoirs 36. This pressure is normally of the order of 90 to 100 pounds per square inch and is sufficient to further compress the springs 70 to a position in which the brake disc 76 is held spaced apart from the wheel disc 80. Therefore, whenever this system pressure is up to normal, the auxiliary brake of my invention will not be engaged and the conventional brakes can then be used to halt the vehicle in a normal manner.

For defining a fluid pressure chamber in each cylinder 64 the periphery of piston 66 carries an elastomeric O-ring 67 in fluid sealing engagement with the interior of cylinder 64. For the same purpose, an O-ring 69 is disposed in an internal annular groove formed in a bore 65 in the outer end wall of each cylinder 64 for sealing engagement with the piston rod 68 slidably passing therethrough. A port 64a formed at the inner end of each cylinder 64 vents the spring side of the cylinder to the atmosphere to avoid any generation of fluid pressure on the spring side of piston 66 which would impede the movement of the piston in response to the spring 70 or the normal operating pressure of the vehicle brake system.

The pressure chambers may be communicated to the reservoirs 36 in a variety of ways. For example, the pressure chambers of cylinders 64 can be directly communicated through suitable conduits to the reservoirs, without any valve means being interposed in the conduits. An arrangement of this type does not provide any selective control of the auxiliary brake system but does automatically actuate the disc brakes upon the failure of air pressure.

Alternatively, a simple check valve may be interposed between the reservoirs and the cylinders 64. As will be apparent, such check valves are arranged to be held in open position by the presence of air pressure within the reservoirs 36 to maintain pressure in the fluid chambers of the cylinders 64. This check valve may comprise a conventional quick release valve 48, but reversed from its usual orientation in the conventional braking system.

These and other alternatives utilizing well known valves will occur to those skilled in the art. As an example of another alternative, Figure 3 illustrates a valve adapted to provide selective control of the auxiliary brake system, while at the same time retaining the automatically operable features of a check or quick release valve, or a system in which no valve at all is utilized.

Referring to Figure 1, the conduits 86 communicate the power cylinders 64 with reservoirs 36 through a selectively controllable and automatically actuable valve 88 which, in turn, communicates with the pair of reservoirs 36 through suitable conduits 90. The valve 88 is shown somewhat schematically in Figure 3. This valve allows the full force of the compressed air in the reservoirs 36 to bear against the outer faces of pistons 66 to normally prevent actuation of the auxiliary brake system. A manually operable lever 92 is connected to the valve 88 through suitable linkage 94 and actuation of this lever produces bleeding of the air pressure present in conduits 86 and power cylinders 64 to the atmosphere. If the lever 92 is moved quickly throughout its stroke, the valve 88 acts as a quick release valve, entirely closing it to reservoirs 36 and dumping all of the pressure contained in conduits 86 and power cylinders 64 to the atmosphere.

Referring to Figure 3, the valve 88 has an inlet port 100 provided with a fitting 102 through which the compressed air of the reservoirs 36 is communicated to the valve through the conduits 90. As is usual, the valve 88 also has an exhaust port 104 coaxially aligned with the inlet port 100 and formed in the valve body on the opposite side of the valve from the inlet port. A chamber 106 is defined within the valve and at diametrically opposite positions is provided with outlets 108 in which fittings 110 are mounted which, in turn, receive the conduits 86 that extend to the power cylinders 64.

A conventional diaphragm 112 is mounted in the chamber 106 coaxially with the ports 100 and 104. The diaphragm has sealing engagement at the lower end of its hub portion with a seat 114 at the upper end of the exhaust port 104. This diaphragm is mounted in a conventional keeper assembly 116 that includes a radially extending flange 118 in abutment with the underside of a peripheral and deformable lip 120 of the diaphragm. A coaxial coil spring 122 at one end abuts the underside of the flange 118 and at its other or lower end is seated on a circular keeper plate 124 which, in turn, is normally seated on the lower end of chamber 106. The spring 122 normally biases the lip 120 of the diaphragm 112 into sealing contact with an annular seat 126 in the upper end of the chamber 106.

A plurality of parallel rods 128 are slidably mounted in the lower end of the valve 88 and have their upper ends drivingly connected to the annular member 124. At their outer ends, the rods 128 are drivingly connected to a disc 130 and the rods have a length such as to support the disc 130 in a position spaced apart from the outer extremity of a push rod 132, whose upper end is affixed in the diaphragm 112.

An end of the link 94 has a pivotal mounting 134 on the valve 88 and a crank arm 136, having a camming engagement with the disc 130.

When air pressure is present in the reservoirs 36, the force of the spring 122 is overcome so that the diaphragm 112 is held in the position shown in Figure 3. The lip 120 of the diaphragm is thus held out of engagement with annular seat 126 whereby the full force of the air pressure of the reservoirs is communicated to the cylinders 64 through the conduits 86.

Upon reduction or failure of the pressure in the reservoirs 36 a consequent imbalance of air pressure is imposed on the diaphragm 120. Thus, the greater pressure in the cylinders 64 reacts on the underside of the diaphragm lip 120 to urge this lip into sealing engagement with the seat 126. This differential air pressure, combined with the force of the spring 122 and the action of the conventional diaphragm 112 and keeper assembly 116, lifts the lower end of the diaphragm out of sealing engagement with the upper end of the exhaust port 104. The air is thus rapidly dumped out of the cylinders 64 to permit automatic application of the auxiliary brake system.

For selective application of the auxiliary brake system, the handle 92 is moved to cause the link 94 to move the disc 130. Initial movement of the disc 130 causes the annular member 124 to move against the end of the spring 122 seated thereagainst. Accordingly, the lip 120 of the diaphragm 112 is forced into sealing engagement with the annular seat 126 against the air pressure of the reservoirs 36.

Further movement of the link 94 brings the disc 130 into engagement with the protruding end of the push rod 132. As a result, the lower end of the diaphragm 112 can be gradually moved out of sealing contact with seat 114 to bleed air out of the cylinders 64 through the conduits 86 and exhaust port 104. After the pressure in the cylinders 64 has been reduced to a desired amount, partial retracting movement of the link 94 permits the diaphragm 112 to once again make the sealing contact 114, while at the same time preserving the sealing engagement of the lip 120 with the annular seat 126.

It will be apparent that when link 94 is moved in a clockwise direction, from its position shown in Figure 3, very rapidly concurrent application of the auxiliary brake system and conventional service brake system may occur.

In the operation of the invention, in the event of any failure of any portion of the conventional brake system which will result in an absence of air pressure to actuate the conventional brakes, this absence of pressure will be communicated through the normally open valve 88 to release all air pressure in the conduits 86 and power cylinders 64, thus permitting springs 70 to thrust the brake disc 76 into forceful braking engagement with the wheel disc 80 in order to bring the vehicle to a halt.

Even though sufficient operating pressure is present in the conventional brake system for actuation of brake drums 28, if the brake drums 32 have been overheated so that they "fade" and cannot be forcefully engaged by the frictional braking elements 30, the lever 92 can be actuated to bleed a sufficient amount of pressure from conduits 86 and power cylinder 64 to permit springs 70 to gradually thrust the brake discs 76 into braking engagement with the wheel discs 80, in order to halt the vehicle.

When it is desired to use the auxiliary brake system of my invention as a parking brake, the lever 92 can be actuated to close the normally open valve 88 and relieve the fluid pressure in cylinders 64 and thus set the brake disc 76 into braking engagement with wheel discs 80. This parking brake action will take place in a semi-trailer and tractor arrangement spontaneously when the tractor is uncoupled from the semi-trailer and air pressure dumped out of the portion of conduits 86 mounted on the semi-trailer.

Although I have described and shown herein a presently preferred embodiment of my invention, it is to be understood that I do not mean to be limited to the embodiment shown and described except insofar as defined in the following claims.

I claim:

1. A brake apparatus, comprising: a rotatable drum; an internal fluid-impelled expanding brake means within said drum; an annular, axially-movable friction element for braking cooperation with said drum and mounted concentrically within said expanding brake means, means for biasing said element into braking engagement with said drum; fluid pressure means having a source of fluid pressure in common with said expanding brake means resisting the action of said biasing means; and valve means for varying the force of said fluid pressure means to actuate said element independently of and concurrently with actuation of said expanding brake means.

2. A brake apparatus, comprising: a support; an internal, fluid-impelled expanding brake means on said support within said drum and that is normally contracted out of engagement with said drum; a rotatable drum coaxially mounted on said support; a friction element mounted on said support within said expanding brake means for movement axially of said support into and out of braking engagement with a cooperative braking element on said drum; spring means on said support normally biasing said friction element into braking engagement with the cooperative element of said drum; an expandable chamber on said support including a movable wall responsive to the biasing action of said spring means; and a source of fluid pressure communicating with said expanding brake means, and with said chamber to oppose said spring means and normally hold said friction element out of engagement with said cooperative element whereby when said source fails said spring means causes braking engagement of said elements.

3. In a fluid operated vehicle brake system of the type having internal expanding brake shoes within a wheel drum, an auxiliary brake apparatus, comprising: a support affixed to an axle of a vehicle; a concentric disc carried by a wheel drum on said axle; an annular friction element axially movably mounted on said support in concentric confronting relationship to said disc and positioned within said brake shoes; spring means on said support yieldably biasing said element into braking engagement with said disc; an expandable chamber on said support including a wall movable in response to the biasing action of said spring means; conduit means communicating said chamber with a source of fluid pressure for operating said brake shoes of said vehicle brake system, said pressure also normally holding said disc and element apart against the action of said spring means; and valve means operatively associated with said conduit means for closing said chamber to said source and reducing fluid pressure in said chamber to permit said spring means to force said element into braking engagement with said disc.

4. In a fluid operated vehicle brake system having internal expanding service brake shoes, an auxiliary brake apparatus, comprising: at least one cylinder affixed to an axle housing of a vehicle and extending longitudinally therealong; a piston rod longitudinally slidably mounted through an outer end wall of said cylinder; a piston secured to said rod and mounted in said cylinder; means including said piston and said cylinder for forming an expandable fluid pressure chamber between said piston and the outer end wall of said cylinder; a coil spring in said cylinder compressed between said piston and an inner end wall of said cylinder; conduit means communicating said chamber to a source of fluid pressure for said shoes of said vehicle brake system to further compress said spring; an annular friction element connected to the inner end of said rod concentrically with the drum of a wheel of said vehicle and within said shoes; a disc carried on said wheel confronting said element; and valve means operatively associated with said conduit means for closing said chamber to said source and reducing fluid pressure in said chamber to permit said spring to force said element into braking engagement with said disc.

5. In a fluid operated brake system for a vehicle including a brake drum on a wheel of said vehicle, radially expandable brake shoe elements operatively associated with said drum, a brake shield supporting said brake shoe elements and fluid pressure means operatively associated with said brake shoe element, an auxiliary brake apparatus, comprising: a wheel disc in said drum concentrically rigidly affixed to said wheel; an annular brake disc axially movably mounted on an axle housing supporting said wheel and disposed between said brake shield and said wheel disc within said brake shoe elements; a plurality of power cylinders rigidly mounted on said housing inwardly of said shield and extending longitudinally of said housing; a piston rod longitudinally slidably mounted through an outer end wall of each of said cylinders, all of said rods slidably extending through bores formed in said shield to be rigidly secured at their outer ends to said brake disc; a piston fastened to each of said rods for axially slidable movement in said cylinders; means in each of said cylinders including said piston for defining an expandable fluid pressure chamber between said piston and the outer end wall of said cylinder; a coiled compression spring in each of said cylinders between said piston and an inner end wall of said cylinder; and conduit means constantly communicating each of said chambers to a source of fluid pressure for said brake shoe elements of said brake system to further compress said springs and hold said brake disc away from said wheel disc during normal operation of said brake shoe elements of said brake system, any drop in said pressure below a predetermined value permitting contraction of said chambers whereby said springs thrust said brake disc into braking engagement with said wheel disc.

6. An apparatus as set forth in claim 5 in which a quick relief valve is operatively associated with said conduit means that is normally held open by any fluid pressure at least as great as said predetermined value whereby said discs are held apart during normal operation of said brake system, any drop in said pressure below said predetermined value causing automatic closing of said source to said chambers and venting of said chambers to the atmosphere to permit said springs to thrust said brake disc into engagement with said wheel disc.

7. An apparatus as set forth in claim 5 in which valve means are operatively associated with said conduit means for closing said source to said chambers and selectively controlling bleeding of pressure from said chambers to permit gradual application of the force of said springs to said brake disc.

8. In a vehicle brake system having a brake drum on an axle, a brake shield on said axle for said drum, internal expanding service brake shoes within said drum and mounted on said shield, and fluid pressure means including a reservoir for selective operation of said service brake shoes, an auxiliary selectively and automatically operable brake apparatus comprising: a flat braking surface on and within said drum confronting said shield; an annular friction element within said drum that is axially movably mounted between said shoes and held against rotation by said shield; means on said axle inboard of said shield and operatively associated with said element to normally bias said element into contact with said brake surface; means including an expandable chamber for opposing the action of said biasing means with fluid pressure from said reservoir, failure of fluid pressure within said reservoir causing said element to be moved into contact with said braking surface by said biasing means; and a normally open valve means operatively associated with said last mentioned means to selectively vary the force of fluid pressure opposing said biasing means concurrently with and separately from actuation of said service brake shoes.

9. In a vehicle brake system having a brake drum on an axle and a brake shield on said axle for said drum, internal expanding service brake shoes within said drum and mounted on said shield, and fluid presssure means including a reservoir for selective operation of said service brake shoes, an auxiliary selectively and automatically operable brake apparatus comprising: a pair of annular plates rigidly affixed to said axle inboard of said shield; a plurality of power cylinders rigidly mounted on and between said plates and equally circularly spaced around the axis of said axle in longitudinal alignment therewith; a reciprocable piston within each of said power cylinders; a piston rod drivingly connected to each of said pistons and protruding outwardly of said cylinder and slidably supported at its outer end in an aligned bore formed in said brake shield; a heavy coil spring compressed within each of said power cylinders between the inward side of said piston and an inner end wall of said power cylinder and adapted to bias said piston and rod outwardly toward said shield; an annular brake disc concentrically mounted around said axle and drivingly connected to the outermost ends of said piston rods, said disc having an outer diameter less than the inner diameter defined by said brake shoes so as to be freely axially movable within said brake drum; a wheel disc concentrically affixed within said wheel for rotation with said wheel and concentrically confronting said brake disc; fluid conduit means intercommunicating the outermost ends of each of said power cylinders with said reservoir for communicating fluid pressure from said reservoir to the outermost sides of said pistons to hold said brake disc out of engagement with said wheel disc when the pressure of fluid in said reservoir is above a predetermined value; and a normally open valve means associated with said conduit that is selectively closeable for relieving fluid pressure within said power cylinders to cause said springs to thrust said brake disc into forceful braking engagement with said wheel disc.

References Cited in the file of this patent

UNITED STATES PATENTS

| | | |
|---|---|---|
| 2,038,162 | Cadman | Apr. 21, 1936 |
| 2,095,575 | Rutherford | Oct. 12, 1937 |
| 2,366,044 | McCune | Dec. 26, 1944 |
| 2,701,626 | Walther | Feb. 8, 1955 |
| 2,726,641 | Hepola | Dec. 13, 1955 |
| 2,754,805 | Beman | July 17, 1956 |
| 2,810,458 | Troxell | Oct. 22, 1957 |

FOREIGN PATENTS

| | | |
|---|---|---|
| 1,109,919 | France | Oct. 5, 1955 |